United States Patent Office 3,498,937
Patented Mar. 3, 1970

3,498,937
NOVEL COMPOSITIONS OF POLYURETHANES AND CARBAMOYL PHOSPHONATES
Adnan A. R. Sayigh, North Haven, and James N. Tilley, Cheshire, Conn., assignors to The Upjohn Company, Kalamazoo, Mich., a corporation of Delaware
No Drawing. Continuation-in-part of application Ser. No. 571,192, Aug. 9, 1966. This application Mar. 10, 1969, Ser. No. 805,881
Int. Cl. C08g 51/00; C09k 3/28
U.S. Cl. 260—2.5
2 Claims

ABSTRACT OF THE DISCLOSURE

Fire retardant polyurethanes are obtained by incorporating into polyurethane forming reaction mixtures a carbamoylphosphonate of the formula:

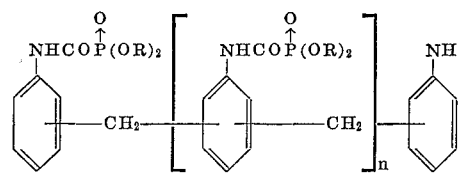

where R=hydrocarbyl ($C_1$–$C_{12}$) or halohydrocarbyl ($C_1$–$C_{12}$) and $n$=0.19 to 1.0.

CROSS-REFERENCE TO RELATED APPLICATION

This application is a containuation-in-part of copending application Ser. No. 571,192 filed Aug. 9, 1966.

BACKGROUND OF THE INVENTION

This invention relates to novel carbamoylphosphonates and to processes for their preparation and processes for their use as fire retardant additives in the preparation of polyurethanes and is more particularly concerned with carbamoylphosphonates derived from polymethylene polyphenyl polyisocyanates, with processes for the preparation of these compounds, with processes for the use of these compounds as fire retardant additives in polyurethanes, and with novel fire retardant polyurethane compositions so obtained.

DETAILED DESCRIPTION OF THE INVENTION

The novel compounds of this invention are carbamoylphosphonates having the formula:

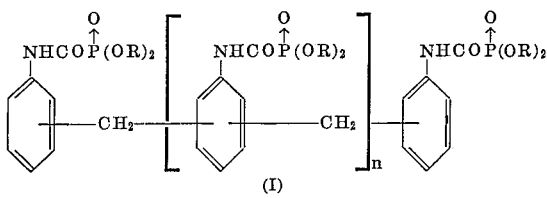

wherein R is selected from the group consisting of hydrocarbyl from 1 to 12 carbon atoms inclusive, and halo-substituted hydrocarbyl from 1 to 12 carbon atoms, inclusive, and $n$ has an average value from about 0.19 to about 1.0.

The term "hydrocarbyl from 1 to 12 carbon atoms, inclusive" as used throughout this specification and claims means the monovalent radical obtained by removing one hydrogen atom from the parent hydrocarbon having the stated carbon atom content. Illustrative of such groups are alkyl such as methyl, ethyl, propyl, butyl, pentyl, hexyl, octyl, decyl, dodecyl, and the like, including isomeric forms thereof; alkenyl such as vinyl, allyl, butenyl, pentenyl, hexenyl, octenyl, dodecenyl, and the like, including isomeric forms thereof; aralkyl such as benzyl, phenethyl, phenylpropyl, naphthylmethyl, and the like; aryl such as phenyl, tolyl, xylyl, naphthyl, biphenylyl, and the like, cycloalkyl such as cyclobutyl, cyclopentyl, cyclohexyl, cycloheptyl, cyclooctyl, and the like including isomeric forms thereof; cycloalkenyl such as cyclopentenyl, cyclohexenyl, cycloheptenyl, cyclooctenyl, and the like, including isomeric forms thereof. The term "halo-substituted hydrocarbyl from 1 to 12 carbon atoms inclusive" as used throughout this specification and claims means a hydrocarbyl group of the stated carbon atom content which group is substituted by at least one halo substituent wherein halo means chloro, bromo, iodo and fluoro. The number of halo substituents can be from 1 to 6 or higher. Illustrative of halo-substituted hydrocarbyl having the above carbon atom content are chloromethyl, trichloromethyl, trifluoromethyl, 2-chloroethyl, 2,3-dichlorobutyl, 5-bromooctyl, 6,7-dibromodecyl, 2,2,2,3-tetrachlorobutyl, 2-chloro-3-fluoropentyl, 4-chlorophenyl, 3-fluorophenyl, 2-chloronaphthyl, 3-chlorobenzyl, 4-fluorobenzyl, 3-bromocyclohexyl, 4-chlorocyclohexenyl, 2-chloropropenyl, 4-bromobutenyl, 2-chlorovinyl, and the like.

The novel compounds of the invention having the Formula I, including the individual compounds within said formula as well as mixtures of two or more individual compounds following within said formula, are useful as fire retardant additives in the preparation of fire retardant polyurethanes, both cellular and non-cellular, as will be described in more detail hereinafter. In addition the compounds (I) can be used as fire retardant additives for other synthetic polymers such as polyvinyl chloride, vinylchloride-vinylacetate copolymers, styrene-acrylonitrile copolymers, polystyrene, polyamides such as nylon, and the like. For this purpose the compounds (I) are incorporated into said polymers by methods well-known in the art.

In addition the compounds of the invention represent a convenient means of storing the corresponding polyisocyanates, from which they are derived (as will be described hereinafter), in the presence of active-hydrogen containing compounds with which said polyisocyanates would otherwise enter into reaction. Thus the compounds of the Formula I can be made to dissociate on heating to elevated temperatures, of the order of 150° C. to about 250° C. into the corresponding dihydrocarbylphosphite

$(RO)_2PH$ and the corresponding polyisocyanate. Hence the compounds of Formula I can be regarded as capped isocyanates and can be employed, for example, in storage stable compositions adapted to form polyurethanes upon heating. Illustratively the compounds of Formula I can be used in storage stable compositions adapted to prepare polyurethane coating compositions wherein the compound (I) and an appropriate polyester polyol or blend of polyols and other active hydrogen containing compositions are maintained in a suitable liquid vehicle conventionally employed in the preparation of varnishes and the like. Such compositions can be maintained for prolonged periods and, at any desired time, can be applied to any surface requiring to be coated and can be cured by heating to a temperature at which the compound (I) dissociates to yield the corresponding polyisocyanate. The resulting polyurethane coatings are characterized by marked resistance to heat and abrasion.

The novel compounds (I) of the invention are prepared conveniently by reaction of the appropriate dihydrocarbyl phosphite II
$(RO)_2PH$ wherein R has the significance hereinbefore defined, with the appropriate polyisocyanate having the formula:

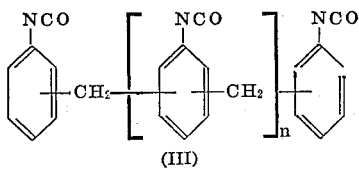

(III)

wherein $n$ has the significance hereinbefore defined.

Advantageously the amount of dihydrocarbyl phosphite (II) employed in said reaction is at least stoichiometric with respect to the polyisocyanate (III) i.e. there is employed at least 1 equivalent of phosphite (II) for each isocyanate group in the polyisocyanate (III). Preferably the dihydrocarbyl phosphite (II) is employed in an amout corresponding to about 5 to 15% excess over the stoichiometric proportion although higher or lower amounts can be employed if desired.

It is advantageous, but not essential, to carry out the reaction of the dihydrocarbyl phosphite (II) and the polyisocyanate (III) in the presence of a basic catalyst. Examples of basic catalysts are alkali metal hydroxides such as sodium hydroxide, potassium hydroxide, lithium hydroxide, and the like, alkali metal lower-alkoxides such as sodium methoxide, potassium ethoxide, potassium t-butoxide, and the like, and tertiary organic amines, for example, trialkylamines such as trimethylamine, triethylamine, triisopropylamine, methyldiethylamine and the like, N,N-dialkylanilines such as N,N-diethylaniline, N,N-dimethylaniline and the like, heterocyclic tertiary amines such as pyridine, quinoline, isoquinoline, N-methylpiperidine, N-ethylpiperidine and the like N-alkylpiperidines, N,N'-dimethylpiperazine, N,N'-diethylpiperazine, and the like N,N'-dialkylpiperazines, and N-alkylmorpholines such as N-methylmorpholine, N-ethylmorpholine, and the like. The preferred catalysts are the volatile tertiary amines such as triethylamine, triisopropylamine, and the like, which can be readily removed from the reaction product when the reaction of dihydrocarbyl phosphite (II) and polyisocyanate (III) is complete.

The amount of catalysts, if any, employed in the above process is advantageously within the range of about 0.1% to about 20% by weight based on polyisocyanate and is preferably within the range of about 1% to about 5% by weight based on polyisocyanate.

The reaction between the dihydrocarbylphosphite (II) and the polyisocyanate (III) is carried out preferably, but not essentially, in the presence of an inert organic solvent. By inert organic solvent is meant an organic solvent which does not enter into reaction with any of the reactants employed or interfere in any way with the progress of the reaction. Examples of inert organic solvents are benzene, toluene, xylene, chlorobenzene o-dichlorobenzene, naphthalene, decalin, tetralin and the like.

The reaction between the dihydrocarbyl phosphite (II) and the polyisocyanate (III) is advantageously conducted at elevated temperatures of the order of about 35° C. to about 150° C., and preferably within the range of about 50° C. to about 100° C. The progress of the reaction can be followed by conventional procedures, for example, by observing the disappearance of isocyanate groups from the reaction using spectrographic or like appropriate analytical procedures. When the reaction has proceeded to completion, as determined by said analytical procedures, the desired reaction product (I) is isolated from the reaction product by conventional procedures, for example by removal of solvent, if present, by distillation followed, if desired, by purification of the crude reaction product, for example, by recrystallization in the case of solids, or distillation in the case of liquids. In many cases, however, no purification of the product (I) is necessary and said product can be employed without further treatment as a fire retardant using the procedures described in detail below.

The polyisocyanates (III), which are employed as starting materials in the preparation of the carbamoylphosphonates (I) of the invention, are a well-known class of polyisocyanates. They are obtained by phosgenation of mixtures of methylene-bridged polyphenyl polyamines obtained by interaction of formaldehyde, hydrochloric acid, and primary aromatic amines for example, aniline, o-chloroaniline, o-toluidine, and the like; see, for example, U.S. Patents 2,683,730, 2,950,263, and 3,012,088; Canadian Patent 700,026; and German specification 1,131,877.

Said polyisocyanates generally contain from about 35 to about 85 percent by weight of polymethylene polyphenyl isocyanates the remainder of said mixture being polymethylene polyphenyl isocyanates of functionality higher than 2.0. When the value of $n$ in Formula III is an average of about 0.2 the formula represents a mixture of polymethylene polyphenyl isocyanates containing approximately 85% by weight of methylenebis(phenyl isocyanate) the remainder of said mixture being polymethylene polyphenyl isocyanates having a functionality higher than 2.0. When $n$ in Formula III has average values of about 0.7 and about 1.0 the formula represents a mixture containing approximately 50% by weight of methylenebis(phenyl isocyanate) in the second case, the remainder of the mixture in each case being polymethylene polyphenyl isocyanates having a functionality higher than 2.0.

The proportions of the various polymethylene polyphenyl isocyanates in the polyisocyanates of Formula III correspond to the proportions of methylene-bridged polyphenyl amines in the intermediate mixture of polyamines which is phosgenated. The desired proportion of methylene-bridged polyphenyl amines in said mixture is generally controlled by varying the ratio of aniline, or other aromatic amine, to formaldehyde in the initial condensation. For example, using a ratio of approximately 4 moles of aniline to 1.0 mole of formaldehyde there is obtained a mixture of polyamines containing approximately 85% by weight of methylene-dianilines. Using a ratio of approximately 4 moles of aniline to about 2.6 moles of formaldehyde there is obtained a mixture of polyamines containing approximately 35% by weight of methylenedianilines. Mixtures of polyamines containing proportions of methylenedianilines intermediate between these limits can be obtained by appropriate adjustment of the ratio of aniline to formaldehyde.

In a further aspect of this invention there are provided novel polyurethanes to which an enhanced degree of fire retardance has been imparted by the incorporation therein of an appropriate amount of at least one compound having the Formula I to provide a phosphorus content in the resulting polyurethane of from about 0.5 to about 3.0% by weight, preferably from about 0.9 to about 1.5% by weight.

The term "fire retardant polyurethanes" employed herein is one well recognized and widely used in the art. It is generally understood to mean, and will be used herein as meaning, a polyurethane which, in the case of a film or coating of 0.5 in. or less in thickness shows a rating of at least "self-extinguishing" in the ASTM D568–56T procedure.

In the preparation of fire retardant polyurethanes according to the invention any of the conventional procedures known in the art can be employed, the novel feature of this aspect of the invention residing in the incorporation into the polyurethane forming reaction mix of the appropriate amount (as defined above) of a compound of the Formula I. While the use of the compounds (I) can be applied to the preparation of fire retardant polyurethanes of all types including cellular and non-cellular polyurethanes, it is of particular application in the preparation of cellular polyurethanes. Accordingly the process of the invention will be illustrated by reference to the preparation of cellular products but it is to be understood that the invention is not limited thereto but is of general application to the preparation of polyurethanes of all types.

The various methods of preparing polyurethane foams are well-known in the art and do not require detailed discussion; see, for example, Dombrow, Polyurethanes, Reinhold Publishing Corporation, New York, pp. 1–105 (1957); Saunders et al., Polyurethanes, Part II, Interscience Publishers, New York, 1964. One of the most common procedures consists in reacting a polyol, for example, a polyester or polyether, with an organic polyisocyanate in the presence of a blowing agent and, if necessary, in the presence of catalyst, surface active agents and other auxiliary agents, whereby simultaneous interaction between the isocyanate and polyol occurs to give the required foam product. This is the so-called "one-shot" procedure. Alternatively, the polyol may be reacted with sufficient polyisocyanate to give an intermediate reaction product containing free isocyanate groups and this product, known as a prepolymer, may then be reacted with water alone or with other blowing agents, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethanes foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate and other di- and higher polyisocyanates such as those listed in the tables of Siefken Ann. 562, 122–135 (1949). Mixtures of two or more of the above isocyanates can be used if desired. Particularly preferred polyisocyanates are those having the Formula III above. Where the latter are employed as polyisocyanates in the process of the invention a particularly convenient manner of introducing the compound (I) into the polyurethane reaction mixture is to react, under the conditions specified hereinabove, the polyisocyanate (III) with a proportion of the appropriate dihydrocarbyl phosphite (II) which is less than the amount required to react with all the free isocyanate groups in the compound (III). There is thus obtained a mixture of the starting polyisocyanate (III) and the desired reaction product (I) which mixture can then be employed as the polyisocyanate component in the preparation of the polyurethane foam.

Similarly any of the prior art polyols conventionally employed in the preparation of foams, can be employed in the process of the invention. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g., catechol, resorcinol, hydroquinone, orcinol, 2,2 - bis(p-hydroxyphenyl)propane, bis(p-hydroxyphenyl)methane and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g. methyl, ethyl, propyl, butyl, and 2-ethylhexyl and the like alkyl arabinosides, xylosides, fructosides, glucosides, rhamnosides, etc.; polyethers prepared by reacting ethylene oxide, propylene oxide, or mixtures thereof with alicyclic polyols such as tetramethylolcyclohexanol; polyols containing a heterocyclic nucleus such as 3,3,5-tris(hydroxymethyl) - 5-methyl-4-hydroxytetrahydropyran and 3,3,5,5 - tetrakis(hydroxymethyl) - 4-hydroxytetrahydropyran; or polyols containing an aromatic nucleus such as 2,2 - bis-(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3-tetrakis(hydroxy - 3 - methylphenyl)propanes, 1,1,4,4-tetrakis(hydroxyphenyl)butanes and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde. Such polyols are available commercially from The Upjohn Company, Carwin Division under the trade name Carwinols in various equivalent weight ranges.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glyco, 1,4-butanediol and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

In making rigid foams in accordance with the process of the invention it is advantageous to add a hydroxyl terminated cross-linking polyol to the reaction mixture to form the best network for foam formation. Advantageously the cross-linking polyols are trimethylolpropane, glycerol, 1,2,6-hexanetriol, pentaerythritol, hydroxyalkylated aliphatic diamines such as N,N,N',N'-tetrakis(2-hydroxypropyl)ethylenediamine, N,N,N',N'-tetrakis(2 - hydroxyethyl)ethylenediamine, and the like, and alkylene oxide reaction products of sugars such as sucrose, and the like.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with a reactive hydrogen containing compound can be employed for this purpose; see, for example, Saunders et al., Ibid, Volume I, pp. 228–232; see, also Britain et al. "J. Applied Polymer Science," 4, 208–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N',N'-tetraethylethylene diamine, N-methylmorpholine, N-ethylmorpholine, N,N,N',N'-tetramethylguanidine, N,N,N',N'-tetramethyl - 1,3 - butanediamine, N,N-dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. Thus said ratio is advantageously within the range of from 1.50 to 0.65:1 and preferably within the range of 1.20:1 to 1:1, whether the isocyanate and polyol (i.e. mixture of conventional polyol and polyol of Formula I) are employed separately in the one-shot process or whether the two components have been reacted to form a prepolymer. The lower ratio of ranges of isocyanate to active hydrogen group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1-dichloro - 1 - fluoroethane, 1,1-difluoro-1,2, 2-trichloroethane and 1,1,1,2-tetrafluoro-2-chlorobutane or mixtures thereof.

Optional additives such as dispersing agents, cell stabilizers, surfactants, flame retardants, and the like which are commonly employed in the fabrication of rigid polyurethan foams, can be employed in the process of the invention. Thus a finer cell structure may be obtained if water soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available from Union Carbide Corporation under the trade name L-5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The fire retardant polyurethanes produced in accordance with the present invention are useful for the purposes for which polyurethanes are conventionally employed. For example, the rigid and semi-rigid polyurethane foams produced according to the invention are useful for insulating purposes either as slab stock or in preformed building panels and, because of their ability to hold lubricants and to resist torque, as transmission plates in power transmission systems using fluids, and in similar systems. The flexible foams produced according to the invention are useful for a variety of cushioning, upholstery and like uses. The elastomeric polyurethanes produced in accordance with the invention find application in the preparation of gaskets, flexible tubing and the like.

When employed as fire retardant additives in the preparation of fire retardant polyurethanes, the compounds of Formula I have the advantage over hitherto known phosphorus containing additives which do not contain active hydrogen atoms, in that the incorporation of the additive (I) into the polyurethane produces markedly smaller changes in physical properties of the resultant polyurethane. For example, when compounds of the Formula I are incorporated, in the proportions set forth above, into rigid polyurethane foams it is found surprisingly that the physical properties, including the structural integrity and strength under humid aging conditions, are not significantly different from those of the corresponding foams produced in the absence of the compounds of the Formula I.

While any of the compounds having the Formula I can be employed in the preparation of fire retardant polyurethane foams it has been found that those compounds having the Formula I in which R represents lower-alkyl possess particularly valuable properties especially when used in preparing fire retardant rigid polyurethane foams. In particular, the compounds of Formula I wherein R represents lower-alkyl show a high degree of stability on storage either alone or in admixture with polyol components of polyurethane systems. In addition this particular subclass of compounds falling within the Formula I exhibits a higher degree of flame retardancy than the bulk of compounds of Formula I. Hence a smaller amount of said compounds of Formula I wherein R represents lower-alkyl is required to achieve a given degree of flame retardancy than when one of the other compounds falling within Formula I is employed.

The term "lower-alkyl" as used herein means alkyl containing from 1 to 6 carbon atoms, inclusive, such as methyl, ethyl, propyl, butyl, pentyl, hexyl and isomeric forms thereof.

The following examples describe the manner and process of making and using the invention and set forth the best mode contemplated by the inventors of carrying out the invention but are not to be construed as limiting.

Example 1

A mixture of 29.09 g. (0.21 mole) of diethylphosphate and 0.8 g. of triethylamine in 30 ml. of chlorobenzene was heated to 100° C. The mixture was stirred and maintained at 95 to 105° C. while a total of 26.7 g. (0.2 equivalent) of PAPI® (polymethylene polyphenyl isocyanate containing approximately 50% by weight of methylenebis (phenyl isocyanate); equivalent weight=133; The Upjohn Company, Polymer Chemicals) was added slowly over a period of 50 minutes. When the addition was complete the resulting mixture was maintained at the above temperature for a further 2.5 hrs. at the end of which time the isocyanate band at 4.4μ in the infrared spectrum had disappeared. The mixture so obtained was heated on a steam bath under reduced pressure to remove chlorobenzene, triethylamine and residual diethylphosphite. The dark brown residue (54 g.) was polyethyl polymethylenepolyphenyl polycarbamoylphosphonate corresponding to Formula I wherein each R=ethyl and n has an average value of 0.7.

Example 2

A mixture of 40.7 g. (0.21 equivalent) of dibutyl phosphite and 0.8 g. of triethylamine in 30 ml. of chlorobenzene was stirred and maintained at 100° C. while a total of 36.7 g. (0.2 equivalent) of PAPI® was added portionwise over a period of 30 minutes.

When the addition was complete the mixture was maintained at approximately 100° C. until the isocyanate band at 4.4μ in the infrared spectrum had substantially disappeared. The mixture so obtained was heated in vacuo until the pot temperature reached 60° C. There was thus obtained a dark brown syrupy residue (67.4 g.) which was polybutyl polymethylene polyphenyl polycarbamoylphosphonate corresponding to Formula I wherein each R=butyl and $n$ had an average value of 0.7.

*Analysis.*—Calcd. for $C_{42.2}H_{64.8}N_{2.7}O_{10.8}P_{2.7}$: P=2.55. Found: P=2.28.

Example 3

A mixture of 153 g. (0.79 mole) of diisobutyl hydrogen phosphite and 3.0 g. of triethylamine in 110 ml. of chlorobenzene was heated to 100° C. and maintained thereat while 99.8 g. (0.75 equivalent) of PAPI® was added over a period of 35 minutes. The resulting mixture was maintained at 100 to 103° C. until the isocyanate band at 4.4μ in the infrared spectrum had disappeared. The mixture so obtained was distilled under reduced pressure (20–30 torr) at 70° C. To the residue was added 110 ml. of chlorobezene and the solvent was again distilled off under similar reduced pressure conditions. The residue was treated with 40 ml. of o-dichlorobenzene and the mixture was again distilled under reduced pressure to remove the solvent. There was thus obtained, as the undistilled residue, 237.9 g. of poly(isobutyl)polymethylene polyphenyl polycarbamoylphosphonate corresponding to Formula I wherein each R=isobutyl and $n$ has an average value of 0.7.

Example 4

A mixture of 161 g. (0.525 mole) of di(2-ethylhexyl) phosphite and 2.0 g. of triethylamine in 75 ml. of chlorobenzene was heated at 100° C. and maintained thereat while a total of 66.5 g. (0.5 equiv.) of PAPI® was added over a period of 38 minutes. The resulting mixture was heated with stirring at 100 to 104° C. until the isocyanate band at 4.4μ in the infrared spectrum had disappeared. The mixture so obtained was distilled under reduced pressure to remove excess chlorobenzene, triethylamine and phosphite. The residue was treated with 75 ml. of chlorobenzene and the latter was removed by distillation under reduced pressure. The residue was then treated with 40 ml. of o-chlorobenzene and the mixture was again subjected to distillation under reduced pressure. The residue (222 g.) so obtained was poly(isobutyl)polymethylene polyphenyl polycarbamoylphosphonate corresponding to Formula I wherein each R=isobutyl and $n$ has an average value of 0.7.

Example 5

A mixture of 108.7 g. (0.525 mole) of di(2-chloroethyl)phosphite and 2.0 g. of triethylamine in 75 ml. of chlorobenzene was heated at 100° C. and maintained there at while a total of 132.9 g. (0.5 equiv.) of PAPI® was added over a period of 32 minutes. The resulting mixture was then maintained at 100°±5° C. with stirring until the isocyanate band at 4.4μ in the infrared spectrum had disappeared. The mixture so obtained was distilled under pressure to remove excess chlorobenzene, triethylamine and phosphite. To the residue was added 75 ml. of chlorobenzene and the mixture was distilled under reduced pressure to remove the solvent. The residue was treated with 35 ml. of o-dichlorobenzene and the mixture again distilled under reduced pressure (0.25 torr) until the pot temperature reached 130° C. There was thus obtained a residue (224.9 g.) which was poly(2-chloroethyl) polymethylene polyphenyl polycarbamoylphosphonate corresponding to Formula I wherein each R=2-chloroethyl and $n$ has an average value of 0.7.

Example 6

A mixture of 127.7 g. (0.825 mole) of diallyl phosphite and 3.0 g. of triethylamine in 110 ml. of chlorobenzene was heated at 100° C. and maintained thereat while a total of 99.0 g. (0.75 equiv.) of PAPI® was added over a period of 35 minutes. The resulting mixture was maintained at 100° C. ±3° C. with stirring until the isocyanate band at 4.4μ in the infrared spectrum had disappeared. The mixture so obtained was distilled under reduced pressure to remove excess chlorobenzene, triethylamine and phosphite. The residue was treated with a further batch of chlorobenzene and the solvent was removed under reduced pressure. The residue so obtained was then treated with o-dichlorobenzene and the mixture was distilled in vacuo. There was thus obtained 213.4 g. of polyallyl polymethylene polyphenyl polycarbamoylphosphonate corresponding to Formula I wherein each R=allyl and $n$ has an average value of 0.7.

Example 7

Using the procedure described in Example 1 but replacing diethylphosphite by diphenylphosphite, there is obtained polyphenyl polymethylene polyphenyl polycarbamoyl phosphonate.

Similarly, using the procedure described in Example 1, but replacing diethyl phosphite by di(cyclohexyl)phosphite, dioctyl phosphite, di(dodecyl) phosphite, di(trifluoromethyl)phosphite, di(2,3-dichlorohexyl)phosphite, di(p-chlorophenyl)phosphite, dibenzylphosphite, di(2-naphthylmethyl)phosphite, dinaphthylphosphite, di(p-bromophenyl)phosphite, and di(2,4,6-tribromophenyl) phosphite, there are obtained the corresponding poly (cyclohexyl), poly(octyl), poly(dodecyl), poly(trifluoromethyl), poly(2,3-dichlorohexyl), poly(p-chlorophenyl), polybenzyl, poly(2-naphhtylmethyl), polynaphthyl, poly-(p-bromophenyl) and poly(2,4,6-tribromophenyl)polymethylene polyphenyl polycarbamoyl phosphonates, resectively.

Example 8

Using the procedure described in Example 1, but replacing the polymethylene polyphenyl polyisocyanate there employed by a polymethylene polyphenyl polyisocyanate containing approximately 70% by weight of methylenebis (phenyl isocyanate) the remainder of said mixture being polymethylene polyphenyl polyisocyanates having a functionality higher than 2.0, there is obtained the corresponding polyethyl polymethylene polyphenyl polycarbamoylphosphonate corresponding to Formula I wherein each R=ethyl and $n$ has an average value of ≥0.22.

Example 9

A series of rigid polyurethane foams was prepared using the various ingredients (all parts by weight) shown in Table I below. Foams A, B, and C were prepared using the compound of the invention prepared as described in Examples 2, 6 and 3, respectively, whereas Foam D was made, for purposes of comparison, using the corresponding carbamoylphosphonate obtained by reacting 1 equivalent of methylene-bis(phenyl isocyanate) and 1 equivalent of dibutyl hydrogen phosphite. All other ingredients of the foams were identical and the proportions comparable.

The procedure employed to make the foams was the same in each case and was as follows.

A mixture of the Carwinol 151, carbamoylphosphonate, DC-201, tetramethylbutanediamine and triethylamine, was prepared by mechanical blending and Freon-11B was added to the mixture until the increase in weight of the mixture reached the desired level. The PAPI® was then added to this mixture with rapid stirring and the resulting mixture was poured into a mould 7″ x 7″ x 9″ dimensions and allowed to rise freely. The resulting foam was then aged at room temperature (approximately 20° C.) for 7 days before determining physical properties. The testing methods employed were those set forth in the manual of "Physical Test Procedures" of the Atlas Chemical Industries, Inc. unless otherwise stated.

TABLE I

| Components | FOAMS | | | |
|---|---|---|---|---|
| | A | B | C | D |
| Carwinol 151 [1] | 77 | 79 | 77 | 77 |
| Example 2 phosphonate | 23 | | | |
| Example 6 phosphonate | | 21 | | |
| Example 3 phosphonate | | | 23 | |
| Dibutyl methylenebis(phenylcarbamoylphosphonate) | | | | 23 |
| DC-201 [2] | 2 | 2 | 2 | 2 |
| N,N,N'N'-tetramethyl-1,4-butanediamine | 0.8 | 0.8 | 0.8 | 0.8 |
| Triethylamine | 0.8 | 0.8 | 0.8 | 0.8 |
| Freon 11B [3] | 28 | 29 | 28 | 28 |
| PAPI® | 85 | 88 | 85 | 85 |
| Density, p.c.f. | 2.20 | 2.00 | 2.20 | 2.20 |
| Compression/to rise, p.s.i. | 22.5 | 27.1 | 31.3 | 28.9 |
| S/D | 10.2 | 13.5 | 14.3 | 13.4 |
| Percent Volume Change at 150° C., 100% Relative Humidity | | | | |
| After 24 hours | 9.0 | 5.2 | 6.7 | −0.7 |
| After 3 days | 10.1 | 7.2 | 7.0 | −0.3 |
| After 7 days | 12.2 | 9.1 | 9.3 | −0.3 |
| Percent Volume Change at 200° F., Ambient Humidity | | | | |
| After 3 days | 5.7 | 2.3 | 3.7 | −2.0 |
| After 7 days | 7.4 | 3.4 | 5.1 | −1.3 |
| Flame test (ASTM D1692-59T) | | | | |
| Max. inches burned | 1½ | 3¾ | 1¹¹⁄₁₆ | 5 |
| Min. inches burned | 1¹⁄₁₆ | 1⅜ | 1³⁄₁₆ | |
| Classification | Self extinguishing→Burning | | | |

[1] Modified propyleneoxide adduct of methylene bridged polyphenyl polyamine; equivalent weight=133: The Upjohn Company, Polymer Chemicals Division.
[2] Organosilicone copolymer surfactant: Dow Corning
[3] Trichlorofluoromethane: Du Pont It will be seen from the above results that there is a marked difference between the physical properties, including the burning properties, of the three foams A, B, and C prepared using compounds of the invention, on the one hand, and the Foam D, prepared using a corresponding compound known in the art on the other.

Similarly using the above procedure but replacing the carbamoylphosphonates prepared as described in Examples 2, 3, and 6 by other carbamoylphosphonates such as those described in Examples 1, 4, 5, 7 and at the end of Example 7, there are obtained rigid polyurethane foams in accordance with the invention.

We claim:
1. A fire retardant composition comprising polyurethane, prepared from organic isocyanates and polyols, polyesters or polyethers, having incorporated therein a fire retardant amount of a carbamoylphosphonate having the formula:

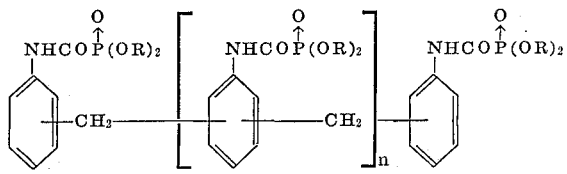

wherein R is selected from the group consisting of hydrocarbyl from 1 to 12 carbon atoms, inclusive, and halo-substituted hydrocarbyl from 1 to 12 carbon atoms, inclusive, and $n$ has an average value from about 0.19 to about 1.0, to provide a phosphorus content in the resulting polyurethane of from about 0.1 to about 3.5 percent by weight.

2. The composition of claim 1 which is a rigid polyurethane foam.

References Cited

UNITED STATES PATENTS

| | | | |
|---|---|---|---|
| 2,909,558 | 10/1954 | Reetz | 260—943 |
| 3,005,010 | 10/1961 | Grisley | 260—943 |
| 3,321,516 | 5/1967 | Popoff | 260—551 |
| 3,361,784 | 1/1968 | Leu | 26—45.9 |

HOSEA E. TAYLOR, JR., Primary Examiner

U.S. Cl. X.R.

260—32.4, 45.9, 551, 943